(12) United States Patent
Nakayama (10) Patent No.: US 8,131,537 B2
(45) Date of Patent: Mar. 6, 2012

(54) APPARATUS AND METHOD FOR MORPHOLOGICAL ANALYSIS

(75) Inventor: Akihiro Nakayama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 2085 days.

(21) Appl. No.: 10/963,150

(22) Filed: Oct. 12, 2004

(65) Prior Publication Data
US 2005/0086048 A1    Apr. 21, 2005

(30) Foreign Application Priority Data
Oct. 16, 2003    (JP) .................. 2003-356307

(51) Int. Cl.
*G06F 17/20*    (2006.01)
(52) U.S. Cl. ............ 704/8; 704/4; 704/7; 704/9; 704/10
(58) Field of Classification Search .................. None
See application file for complete search history.

(56) References Cited

U.S. PATENT DOCUMENTS

| | | | | |
|---|---|---|---|---|
| 5,225,981 A | * | 7/1993 | Yokogawa | 704/2 |
| 5,251,129 A | * | 10/1993 | Jacobs et al. | 704/9 |
| 5,323,316 A | * | 6/1994 | Kadashevich et al. | 704/9 |
| 5,594,641 A | * | 1/1997 | Kaplan et al. | 1/1 |
| 6,035,268 A | * | 3/2000 | Carus et al. | 704/9 |
| 6,098,035 A | * | 8/2000 | Yamamoto et al. | 704/9 |
| 6,405,161 B1 | * | 6/2002 | Goldsmith | 704/9 |
| 6,442,524 B1 | * | 8/2002 | Ecker et al. | 704/277 |
| 6,529,865 B1 | * | 3/2003 | Duan et al. | 704/9 |
| 2002/0152246 A1 | * | 10/2002 | Critchlow | 707/535 |
| 2003/0009331 A1 | * | 1/2003 | Schalkwyk et al. | 704/237 |

FOREIGN PATENT DOCUMENTS

JP    08-087504 A    4/1996

OTHER PUBLICATIONS

Maruyama, H. et al, "Japanese Morphological Analysis Based on Regular Grammar," Transactions of IPSJ, vol. 35, No. 7, pp. 1293-1299.

* cited by examiner

*Primary Examiner* — Leonard Saint Cyr
(74) *Attorney, Agent, or Firm* — Steven M. Greenberg, Esq.; Carey, Rodriguez, Greenberg & O'Keefe (57) ABSTRACT

To improve the processing speed of a morphological analysis system, an analysis processing part retrieves words constituting a natural language sentence from a word dictionary, retrieves concatenation rules from a grammar dictionary, creates an automaton based on the words and the concatenation rules, and obtains a morphological analysis. The grammar dictionary stores rules integrating concatenation rules representing non-null transitions and concatenation rules representing null transitions in which transition sources of the first concatenation rule are their transition destinations. To create the automaton, an optimal solution searching part of the analysis processing part generates, responsive to an input word entered into the automaton, states necessary for transition according to the concatenation rules corresponding to the input word without generating any state that can be transited by pursuing a null transition succeeding the generated states.

9 Claims, 10 Drawing Sheets

| Surface | POS code |
|---|---|
| "The" | Article |
| "The" | Adverb |
| "little" | Adjective |
| "little" | Adverb |
| "little" | Noun |
| "boy" | Noun |
| "boy" | Interjection |
| "ran" | Verb |
| "ran" | Noun |
| "quickly" | Adverb |
| ... | |

| POS code | Adjacency definitions |
|---|---|
| Article | :START→Adjective |
| Adverb | :Noun→Verb |
| Adjective | :Verb→Adverb |
| Adverb | :Adverb→END |
| Noun | :Numeric→Verb |
| Noun | |
| Interjection | |
| Verb | |
| Noun | |
| Adverb | |
| ... | |
| null | :Non→Numeric |
| ... | |

40

APPARATUS AND METHOD FOR MORPHOLOGICAL ANALYSIS

BACKGROUND OF THE INVENTION

The present invention relates to apparatus and methods for performing morphological analysis of natural language text using a computer.

Morphological analysis is an important procedure in natural language processing using computers for analyzing natural language text such as a sentence (hereinafter referred to as an input sentence or simply a sentence), decomposing it into words, and estimating the parts of speech of the words of the text.

Morphological analysis is largely performed in three steps: retrieving a word candidate, retrieving a concatenation rule for the part of speech corresponding to each word candidate, and searching for an optimal solution with respect to the retrieved word candidate and the concatenation rule.

Herein, the retrieval of the word candidate is a process of segmenting an input sentence into appropriate character strings, collating each word with a prepared word dictionary (database), and acquiring the words (word candidates) that can make up the input sentence.

The retrieval of the concatenation rule for the part of speech is a process of acquiring the concatenation rule possibly used for the concatenation of each word by referring to a prepared grammar dictionary (database) based on the part of speech of each word. The part of speech may depend on the context in which the word candidate is used. Concatenation rules for all the parts of speech (part of speech candidates) that can be taken by the words obtained by retrieval of word candidates are thus acquired.

The search for an optimal solution is a process of combining the words in accordance with the concatenation rules, and selecting the optimal word string to make up the input sentence.

Usually, a sentence gives rise to a plurality of "word candidates" and "part of speech candidates." Generally, the process for dealing with candidates can be treated as a state transition, whereby a morphological analysis system using the "Non-deterministic Finite-state Automaton (NFA)" is implemented. Such an approach is described by Hiroshi Maruyama and Shiho Ogino in "Japanese Morphological Analysis Based On Regular Grammar," *Information Processing Society of Japan*, Japan Information Processing Society, July, 1994, Vol. 35, No. 7, p. 1293-1299.

Figure 11:
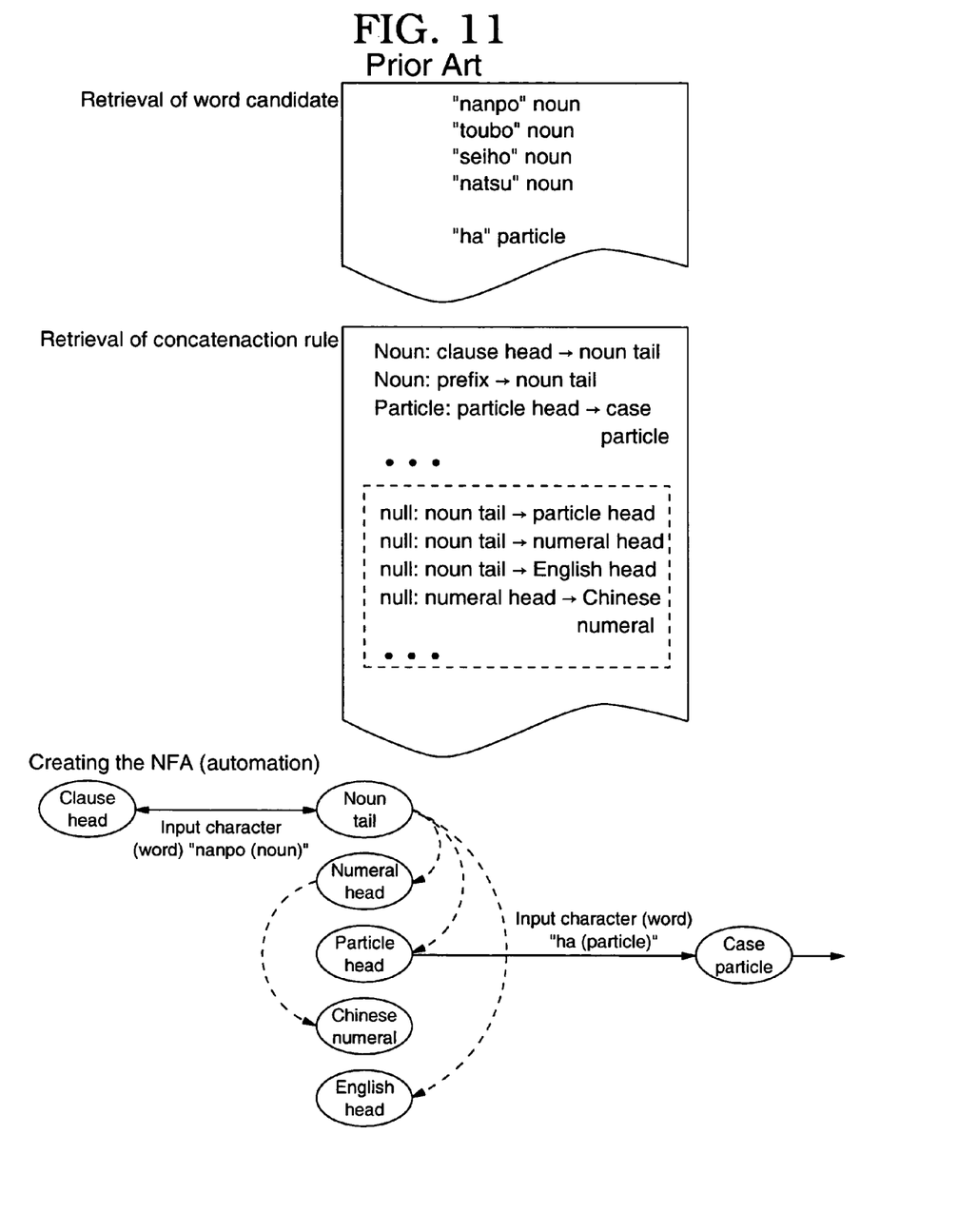
FIG. 11 is a diagram showing a process of morphological analysis in a conventional morphological analysis system.

FIG. 11 is a diagram showing a morphological analysis process with the conventional morphological analysis system.

As an example, morphological analysis of the input sentence "Nanpo ha natsu da," which in English reads "It is hot in the south," will be considered.

First, the retrieval of word candidates is performed, thereby acquiring the word candidates "nanpo (noun)", "ha (particle)", and "natsu (noun)."

Then, the concatenation rule for the part of speech is retrieved, whereby the concatenation rule corresponding to the part of speech for each word candidate is acquired. In the example, the concatenation rules "noun: clause head→noun tail" for noun, "noun: prefix→noun tail" for noun, and "particle: particle head→case particle" for particle are acquired. This means that in the concatenation rule "noun: clause head→noun tail," for example, when a predetermined noun exists in the sentence, a concatenation from clause head to noun tail before and after the noun is permitted. Herein, the clause head and the noun tail denote the states (nodes) when the search for an optimal solution is performed with the NFA. That is, in the concatenation rule "noun: clause head→noun tail," the NFA corresponding to the input sentence transits to the state "noun tail", if the noun is input in the state "clause head."

Also, the NFA for searching for optical solution may make the null transition (ε transition) from a certain state to another state without accompanying the input character. For example, when in the state "noun tail," the NFA can transit to the state "particle head" through the null transition, whereby the particle can be concatenated after the noun. Accordingly, the information regarding this null transition is also stored in the grammar dictionary as the concatenation rule for the part of speech, whereby the concatenation rules required for retrieval of the concatenation rule for the part of speech are acquired. In the example of FIG. 11, the concatenation rules for the noun tail "null: noun tail→particle head" and "null: noun tail→numeral head" are acquired.

To search for the optimal solution after the retrieval of words and concatenation rules, the NFA is created as shown in FIG. 11. In the example, the NFA transits from state "clause head" to state "noun tail" responsive to input of the noun "nanpo." Then, the NFA is transitable from state "noun tail" to "numeral head," "particle head," or "English head" through the null transition, and further transitable from state "numeral head" to "Chinese numeral," whereby all the possible states are generated. And since the particle "ha" exists after the word "nanpo" in the actual input sentence, the state "particle head" is selected by input of the particle "ha," and the NFA transits to the state "case particle."

As described above, in the morphological analysis, the non-deterministic finite-state automaton (NFA) can be used to search for the optimal solution from the word candidate obtained and the concatenation rule for the part of speech.

However, generally, in the NFA, the next state is not uniquely determined for the same state and the same input. Thus, there is a tendency to increase the number of search paths. Accordingly, morphological analysis systems using the NFA are slow.

To improve the processing speed of a morphological analysis system using an NFA, it is conventionally common practice that the concatenation rules for the parts of speech are preprocessed to remove the null transition from the NFA. In the example of FIG. 11, the transition from state "clause head" to state "particle head" is known in advance only by referring to the "concatenation rule for the part of speech" before starting the processing. Thus, the concatenation rule of "noun: clause head→noun tail" as the non-null transition and the concatenation rule "null: noun tail→particle head" as the null transition are integrated beforehand into the "noun: clause head→particle head," whereby the equivalent processing is enabled without treating the null transition. This method is employed and widely known in fields other than morphological analysis as the transformation for removing the null transition from the NFA.

As is apparent from FIG. 11, however, most of the states generated in dealing with the "concatenation rule for the part of speech" are discarded at the point of time when the word is actually input in the morphological analysis. In the example of FIG. 11, most of the states "noun tail," "numeral head," "Chinese numeral," and "English head" are discarded because there is no possibility of continuing transition at the point of time when the word "ha" following the word "nanpo" is input. Thus, it is inefficient to generate many states that may be discarded immediately after generation.

Also, to search for the optimal solution using the NFA, a collation operation for checking whether or not the concatenation rule is acceptable by retrieving the concatenation rule between predetermined words and actually inputting the concatenation rule into the NFA is performed successively for each word and each concatenation rule. For example, after input of the word "nanpo," if the optimal concatenation rule corresponding to the succeeding word "ha" is searched in FIG. 11, the concatenation rules for particle and noun are input into the NFA for the collation operation, because the word "ha" has the concatenation rule as not only the particle but also the noun. Therefore, in the case where there are many corresponding concatenation rules, the number collation operations increased, and the searching process for the optimal solution is very burdensome.

SUMMARY

It is an object of the invention to improve the processing speed of morphological analysis systems using NFAs.

It is another object of the invention to improve the processing speed of morphological analysis by suppressing the generation of unwanted states in creating the NFA.

It is a further object of the invention to improve the processing speed of morphological analysis by decreasing the frequency of checking whether or not an input is acceptable to the NFA.

In order to accomplish the above and other objects, this invention may be realized as a morphological analysis apparatus or system constituted as follows. This system comprises a word candidate retrieving means for retrieving words constituting the natural language sentence (processing object) from a word dictionary, a concatenation rule retrieving means for retrieving concatenation rules possibly used for concatenation of the words from a grammar dictionary based on a part of speech of each word obtained, and an optimal solution searching means for searching for a solution of morphological analysis by creating an automaton corresponding to the natural language sentence based on the retrieved words and the concatenation rules. Also, the system may comprise a preprocessing means for transforming the concatenation rules stored in the grammar dictionary.

More particularly, the preprocessing means transforms the concatenation rules stored in the grammar dictionary to new concatenation rules by integrating first concatenation rules representing non-null transitions and second concatenation rules representing null transitions, destinations of which are transition sources of the first concatenation rules. Preferably, the preprocessing means may further transform the concatenation rules to the new concatenation rules by integrating a plurality of concatenation rules representing transitions with states of null transition and capable of being consecutive. Through this preprocessing, the concatenation rules stored in the grammar dictionary have the concatenation rules with the null transition integrated into other concatenation rules and removed.

The optimal solution searching means creates an automaton and generates a transition path and a state of transition destination responsive to an input word entered into the automaton, in which states necessary for transition according to the concatenation rules corresponding to the input word are generated; however, no a state is generated that can be transmitted by pursuing a null transition succeeding the generated states.

Also, the optimal solution searching means searches a concatenation rule in which its transition source is an immediately previously generated state from the concatenation rules regarding an input word retrieved by the concatenation rule retrieving means, when a transition path and a state of a transition destination are generated by entering the input word into the automaton.

To accomplish the above objects, this invention may be realized as a morphological analysis method as follows, which method may be performed using a computer. The morphological analysis method comprises a step of retrieving words constituting the natural language sentence of a processing object from a word dictionary constructed in storage means, a step of retrieving concatenation rules possibly used for concatenation of the words from a grammar dictionary constructed in the storage means based on a part of speech of each retrieved word, and a step of creating an automaton corresponding to the natural language sentence (processing object) based on the retrieved words and the concatenation rules. The step of creating the automaton may further comprise generating states necessary for transitions according to the concatenation rules corresponding to the input word, but not generating any state transitable by pursuing a null transition succeeding the generated states when entering the input word into the automaton to generate a transition path and a state of a transition destination.

The step of creating the automaton may further comprise searching for a concatenation rule whose transition source is an immediately previously generated state from the retrieved concatenation rules regarding the input word when entering the input word into the automaton to generate a transition path and a state of a transition destination.

Prior to each step of the morphological analysis, the method may comprise a preprocessing step of reading concatenation rules stored in the grammar dictionary constructed in storage means, and integrating first concatenation rules representing non-null transitions and second concatenation rules representing null transitions, destinations of which are transition source of the concatenation rules, to store the integrated concatenation rules in the grammar dictionary.

This invention may be realized as a program for controlling a computer to operate as the morphological analysis system, or a program for enabling a computer to perform the processing corresponding to each step of the morphological analysis method. This program may be stored and delivered in a magnetic disk, an optical disk, a semiconductor memory, or any other recording medium, or distributed via a network.

DETAILED DESCRIPTION

Figure 1:
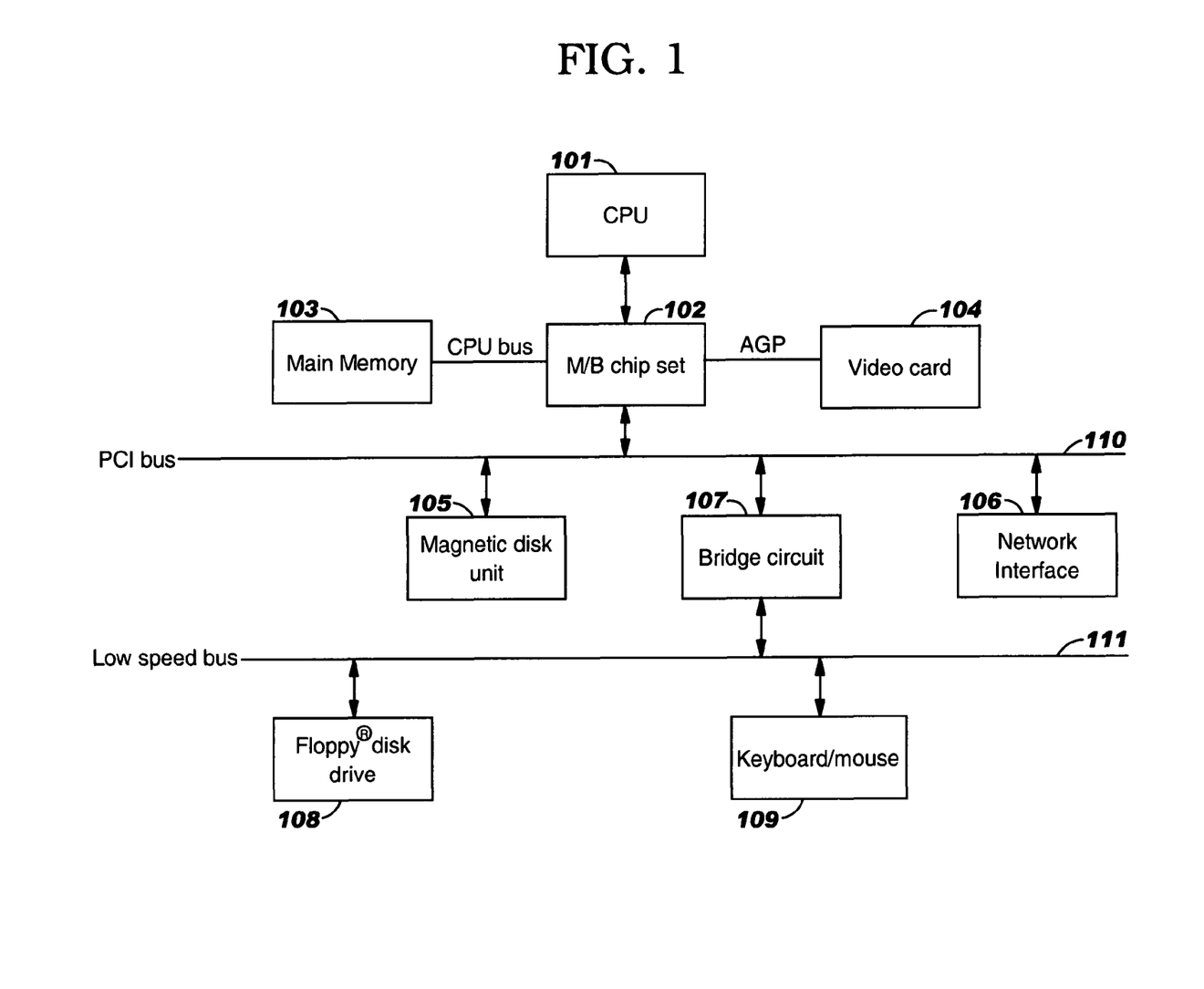
FIG. 1 is a block diagram schematically showing the hardware configuration of a computer apparatus suitable for implementing a morphological analysis system according to an embodiment of the invention.

FIG. 1 is a block diagram schematically showing the hardware configuration of a computer apparatus suitable for implementing a morphological analysis system according to an embodiment of the invention.

The computer apparatus as shown in FIG. 1 comprises a CPU (Central Processing Unit) 101 as arithmetic operation means, a main memory 103 connected via an M/B (Mother Board) chip set 102 and a CPU bus to the CPU 101, a video card 104 connected via the M/B chip set 102 and an AGP (Accelerated Graphics Port) to the CPU 101, a magnetic disk drive (HDD) 105 connected via a PCI (Peripheral Component Interconnect) bus 110 to the M/B chip set 102, a network interface 106, and a floppy (registered trademark) disk drive 108 and a keyboard/mouse 109 connected via a low speed bus 111 such as an ISA (Industry Standard Architecture) bus, a bridge circuit 107, and the PCI bus to the M/B chip set 102.

FIG. 1 only exemplifies the hardware configuration of the computer apparatus for implementing the embodiment; various other configurations may used as well. For example, only the video memory may be mounted, instead of providing the video card 104, to process the image data in the CPU 101, or as an external storage unit, a CD-R (Compact Disc Recordable) or a DVD-RAM (Digital Versatile Disc Random Access Memory) drive may be provided via an interface such as the ATA (AT Attachment) or SCSI (Small Computer System Interface).

Figure 2:
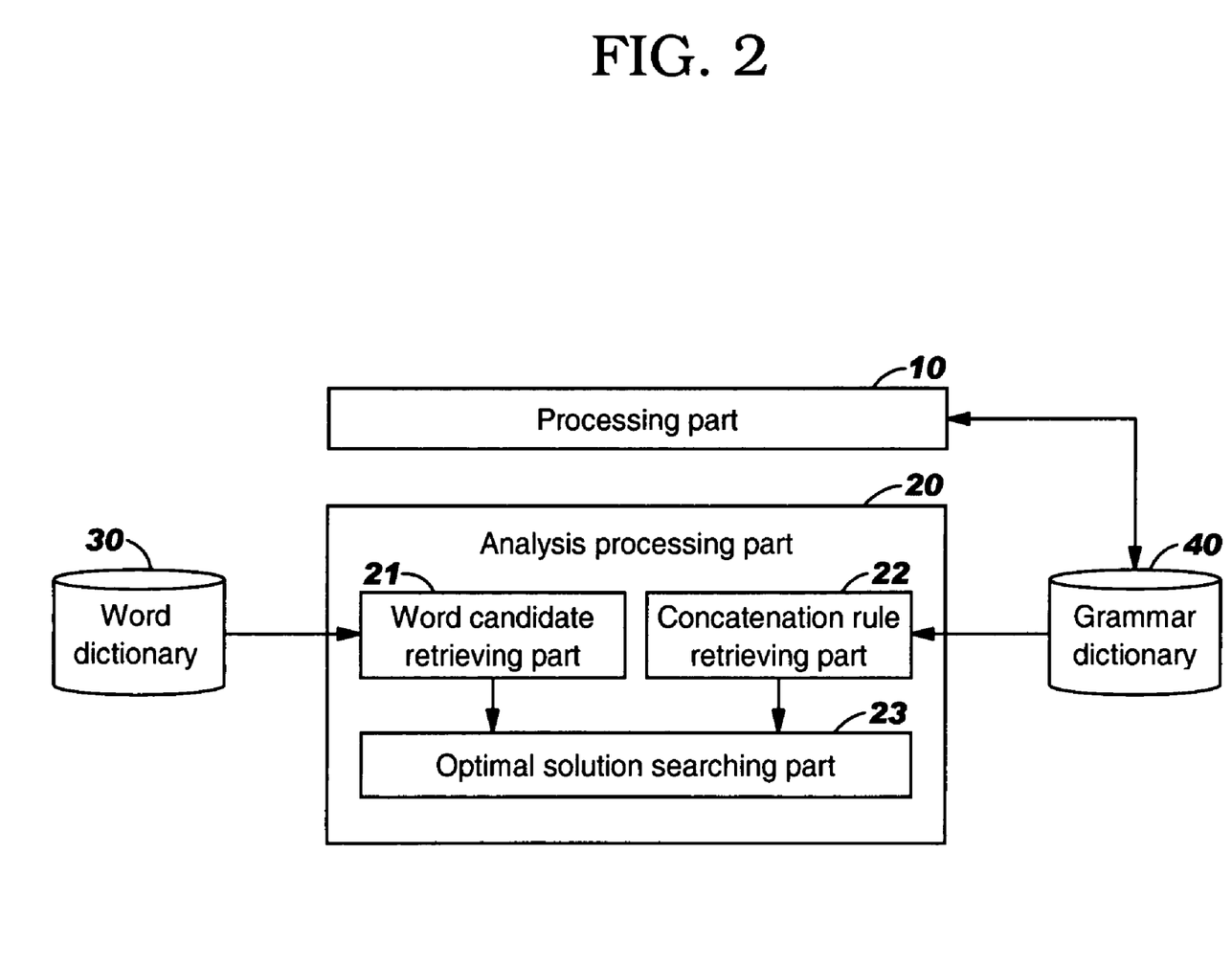
FIG. 2 is a diagram showing the functional configuration of the morphological analysis system according to an embodiment of the invention.

FIG. 2 is a diagram showing an exemplary functional configuration of the morphological analysis system according to an embodiment of the invention.

Referring to FIG. 2, the morphological analysis system of this embodiment comprises a preprocessing part 10 for preprocessing concatenation rules, an analysis processing part 20 for performing the morphological analysis, and a word dictionary 30 and a grammar dictionary 40 used for the morphological analysis by the analysis processing part 20. The preprocessing part 10 and the analysis processing part 20 may be implemented by, for example, the CPU 101 under program control in the computer apparatus, as shown in FIG. 1. The word dictionary 30 and the grammar dictionary 40 may be stored in the magnetic disc unit 105, for example, as shown in FIG. 1.

The analysis processing part 20 comprises a word candidate retrieving part 21 for retrieving a word candidate, a concatenation rule retrieving part 22 for retrieving a concatenation rule for the part of speech, and an optimal solution searching part 23 for searching for an optimal solution for the word candidate and the concatenation rule, which are the retrieval results. The word dictionary 30 registers at least the words and the information designating the part of speech. The grammar dictionary 40 stores the concatenation rules for the part of speech. The concatenation rule may be represented by a pair of transition source state (node) and transition destination state (node). Initially, as the concatenation rule, the concatenation rule representing a non-null transition that is applied by input of a predetermined word, and the concatenation rule representing a null transition (ε transition) that is applied without input character from a predetermined state are stored.

The preprocessing part 10 integrates the concatenation rule representing the null transition (ε transition) in the concatenation rule for the part of speech stored in the grammar dictionary 40 as a preprocessing for morphological analysis. In this embodiment, the concatenation rule representing a predetermined non-null transition and the concatenation rule representing the null transition and consecutive before the concatenation rule representing the non-null transition (this consecutive relation is hereinafter referred to as preceding) are integrated into a new concatenation rule.

Figure 3:
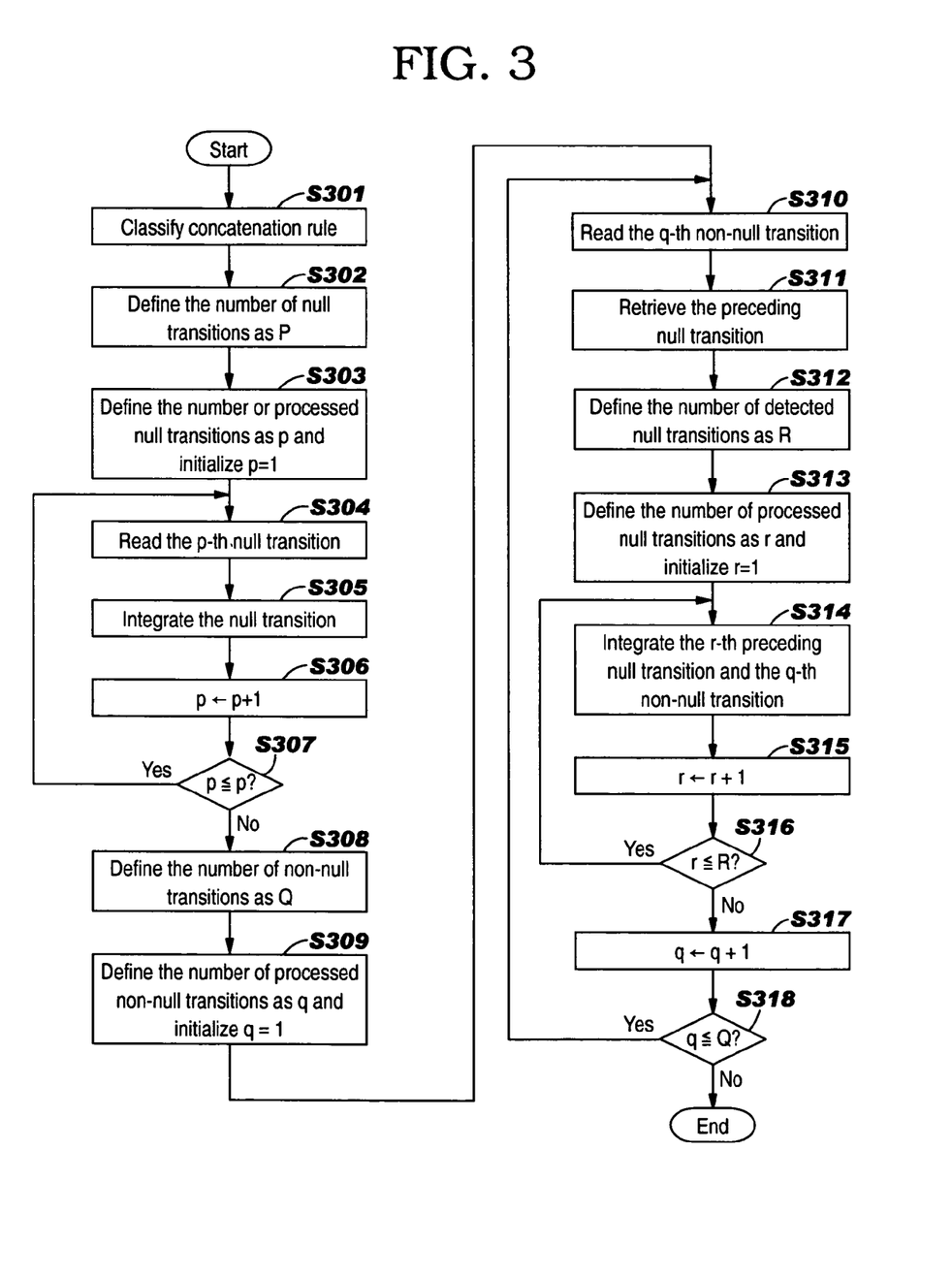
FIG. 3 is a flowchart for explaining the processing of a preprocessing part in this embodiment.

FIG. 3 is a flowchart for explaining the preprocessing part 10 in this embodiment.

As shown in FIG. 3, the preprocessing part 10 classifies the concatenation rule stored in the grammar dictionary 40 into the null transition and the non-null transition (step 301). The number of null transitions is defined as P (step 302), and a variable indicating the number of processed null transitions is defined as p and initialized (p:=1) (step 303).

The preprocessing part 10 reads the p-th null transition from the grammar dictionary 40 (step 304), and integrates the p-th null transition, if possible (step 305). Then, the value of the variable p is incremented by 1 (step 306), and the processing following step 304 is repeated for all the null transitions (i.e., until p is equal to P) (step 307). Each null transition read from the grammar dictionary 40 and undergoing the integration process, as needed, is held in predetermined storage means such as the main memory 103 or the magnetic disk unit 105, for example, as shown in FIG. 1.

Figure 4:
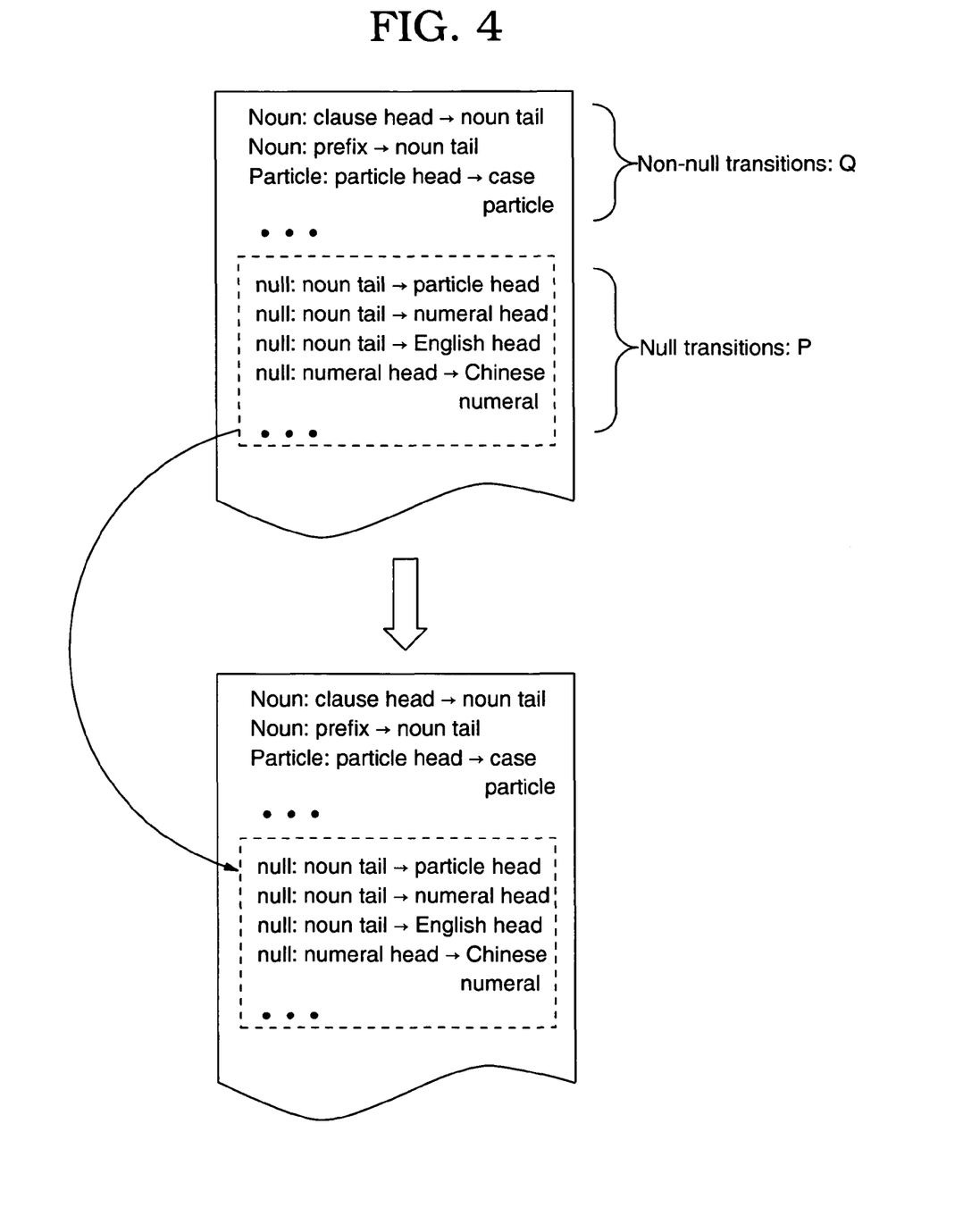
FIG. 4 is a diagram exemplifying the concatenation rules used in this embodiment.

Herein, the integration of null transition is as follows. Suppose that the concatenation rules exist as shown in FIG. 4. Taking notice of "null: noun trail→numeral head" and "null: numeral head→Chinese numeral" among the concatenation rules representing the null transition, it can be found that the transition without any input character is permitted from noun tail to numeral head and from numeral head to Chinese numeral. Thus, a rule "null: noun tail→Chinese numeral" is generated by integrating them. Thereby, regarding the integrated concatenation rule, when the noun is followed by Chinese numeral, the processing is performed through one transition of noun tail→Chinese numeral, though two transitions of noun tail→numeral head→Chinese numeral are required.

Then, the preprocessing part 10 defines the number of non-null transitions stored in the grammar dictionary 40 as Q (step 308), and defines a variable indicating the number of processed non-null transitions as q, and initializes q (q:=1) (step 309). Thereafter, the preprocessing part 10 reads the q-th non-null transition from the grammar dictionary 40 (step 310), and retrieves the null transition preceding the read non-null transition from among the non-null transitions held in the predetermined storage means and having undergone the necessary integration process (step 311). Then, the number of detected null transitions (hereinafter referred to as a preceding null transition) is defined as R (step 312), and a variable indicating the number of preceding null transitions already processed is defined as r and initialized (r:=1) (step 313).

Then, the preprocessing part 10 integrates the preceding r-th null transition and the q-th non-null transition of notice to generate a new concatenation rule (step 314). For example, in the concatenation rules as shown in FIG. 4, when "particle: particle head→case particle" is noted as the q-th non-null transition, the concatenation rule of null transition preceding the non-null transition is only "null: noun tail→particle head." Accordingly, the new concatenation rule "particle: noun tail→case particle" is generated by integrating them.

Then, the preprocessing part 10 increments the value of variable r by 1 (step 315), and the processing following step 314 is repeated for all the preceding null transitions (i.e., until r is equal to R) (step 316).

If the integration process has been completed for all the null transitions preceding the q-th non-null transition of notice ("No" at step 316), the preprocessing part 10 increments the value of variable q by 1 (step 317), and the processing following step 310 is repeated for all the non-null transitions (i.e., until q is equal to Q) (step 318).

If the above processing has been completed for all the non-null transitions ("No" at step 318), the new concatenation rule generated at step 314 is stored in the grammar dictionary 40 and the procedure is ended.

In the way described above, a plurality of concatenation rules representing the state transition by null transition and capable of consecutively occurring are integrated into one concatenation rule. Furthermore, the concatenation rule representing a predetermined non-null transition and the concatenation rule representing the null transition in which a transition source of the concatenation rule is a transition destination are integrated and transformed into one concatenation rule. In the subsequent morphological analysis process, the new concatenation rule generated through the preprocessing is stored in the grammar dictionary 40 for analysis processing. That is, this preprocessing involves adequately integrating the concatenation rules for the part of speech stored in the grammar dictionary 40, and creates the new grammar dictionary 40. Accordingly, the preprocessing may be performed only once at the first time in the morphological analysis system, but need not be performed every time of executing the morphological analysis processing.

When the processing through the state transition using the NFA is performed, it is always necessary to determine whether to immediately accept any input from a predetermined state.

Figure 5A:
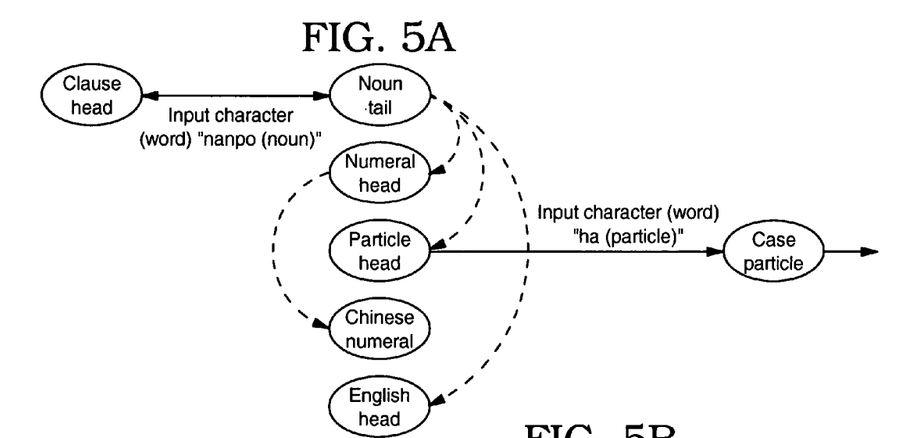
FIGS. 5A and 5B are diagrams for explaining a state transition using an NFA (automaton).
Figure 5B:
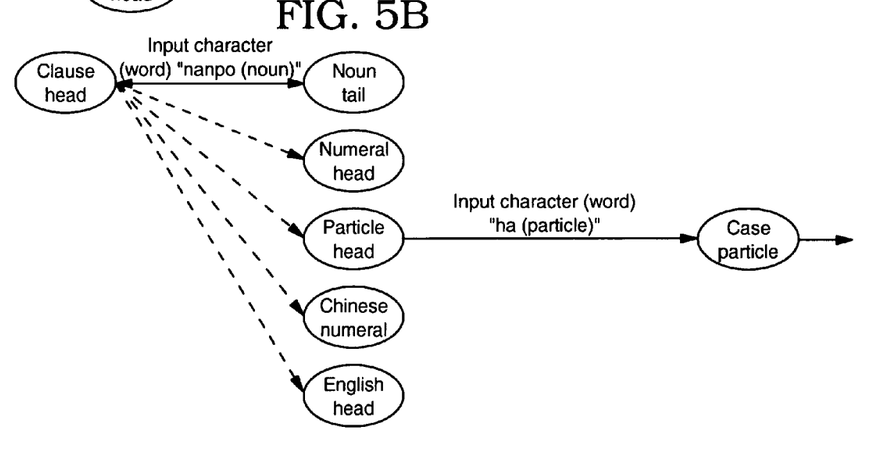

FIGS. 5A and 5B show diagrams for explaining the state transition using the NFA.

As shown in FIG. 5A, in a case where an input sentence "Nanpo/ha/natsu/da" is processed using the concatenation rules of FIG. 4, if "nanpo (noun)" is input with the state of noun tail, the states of numeral head, particle head, Chinese numeral, and English head are generated in accordance with the concatenation rule of null transition from the noun tail, and the operation waits for input of the character succeeding "nanpo (noun)." This is also true with the conventional concatenation rules where the preceding non-null transition and the succeeding null transition are integrated to remove the null set. That is, at the point of time when "nanpo (noun)" is input, the states of numeral head, particle head, Chinese numeral, and English head are immediately generated, as shown in FIG. 5B.

Thereby, even when a word of not "ha (particle)" but "3 (numeral)" is input after "nanpo (noun)," it is possible to immediately determine whether or not the next transition is permitted, and make the transition. This is desirable as an operation of the NFA carrying a ready state for the next input at any time. However, in the case where the NFA is used in the morphological analysis system, the concatenation rules "particle: particle head→case particle" and "null: noun tail→particle head," or the integrated concatenation rule "particle: noun tail→case particle" is selected at the point of time when "ha (particle)" is input after "nanpo (nouns)," and the states of numeral head, Chinese numeral, and English head are discarded. That is, this is inefficient because many states are discarded immediately after generation.

Figure 6:
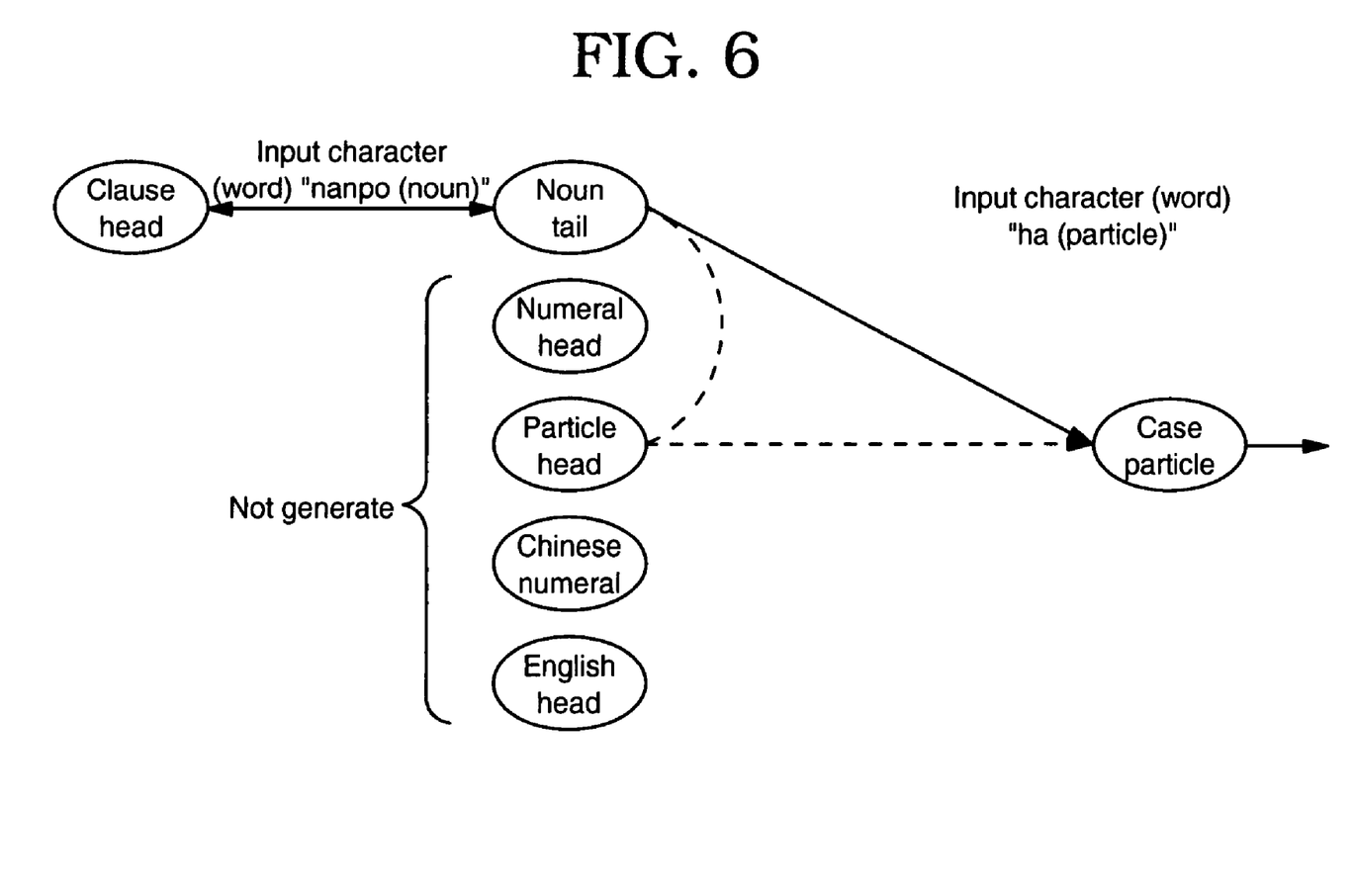
FIG. 6 is a diagram showing how to generate an NFA state in this embodiment.

On the contrary, in this embodiment, when a predetermined word is input, none of the states that can be transit by pursuing the null transition immediately succeeding are generated. Using a new concatenation rule generated by integrating the predetermined non-null transition and the null transition preceding it, after the word succeeding the predetermined word is input, only the states required for transition are generated, as described above.

FIG. 6 is a diagram showing how to generate an NFA state in this embodiment.

As shown in FIG. 6, when "nanpo (noun)" is input, the state of noun tail is generated, and when "ha (particle)" is input, the state of case particle is generated based on the concatenation rule "particle: noun tail→case particle," whereby the unwanted states (i.e., immediately discarded states) such as numeral head, Chinese numeral, and English head are not generated from the beginning. Also, the particle head is not generated, because the concatenation rule of null transition "null: noun tail→particle head" is included in the concatenation rule after integration "particle: noun tail→case particle."

The above operation is applicable, because from a processing feature that the NFA corresponding to an input sentence is created when the NFA is used for the morphological analysis processing, the created NFA may correspond to only the input sentence, but it is not required to meet the general demand for the NFA "holding the ready state for any succeeding input at any time."

As described above, the created NFA does not include the null transition, and the state discarded immediately after generation is not generated from the beginning; consequently, the processing speed over the entire analysis process can be increased.

The analysis processing part 20 will be described below.

The analysis processing part 20 performs the morphological analysis processing using the word candidate retrieving part 21, the concatenation rule retrieving part 22, and the optimal solution searching part 23.

Figure 7:
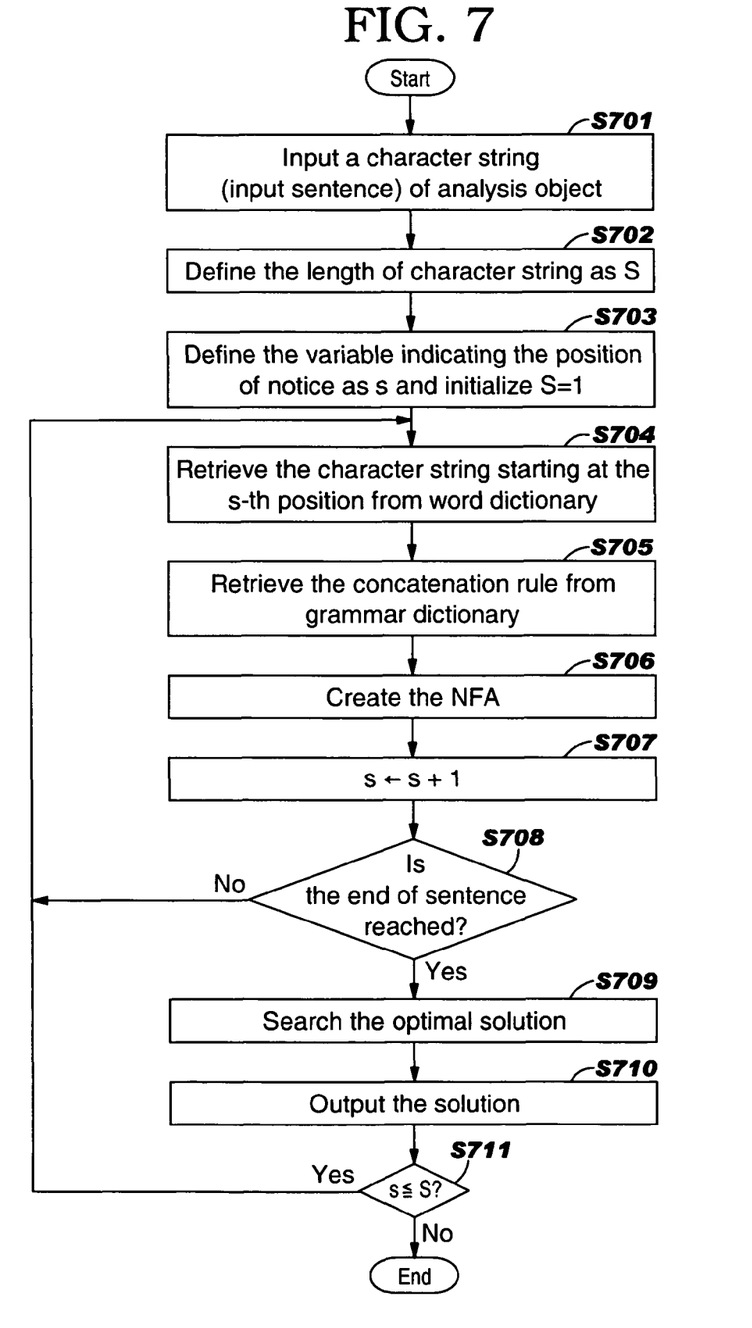
FIG. 7 is a flowchart for explaining the processing of an analysis processing part in this embodiment.

FIG. 7 is a flowchart for explaining the processing of the analysis processing part 20 in this embodiment.

As shown in FIG. 7, the analysis processing part 20 inputs an input sentence (character string) of an analysis object (step 701), defines the length of input sentence (number of characters) as S (step 702), and defines the variable indicating the position of the character to be noted for processing as s, and initializes s (s:=1) (step 703). The word candidate retrieving part 21 retrieves a word (word candidate) corresponding to the character string starting at the s-th position of the input sentence by referring to the word dictionary 30 (step 704). Also, the concatenation rule retrieving part 22 retrieves the concatenation rule corresponding to the word candidate obtained at step 704 by referring to the grammar dictionary 40 (step 705). The detected word candidate and concatenation rule are held in the main memory 103 or a cache memory of the CPU 101 as shown in FIG. 1, for example, for the further processing in the optimal solution searching part 23.

The analysis processing part 20 enables the optimal solution searching part 23 to generate a transition path and a state of transition based on the concatenation rule detected by the concatenation rule retrieving part 22, and create the NFA corresponding to the input sentence (step 706). In creating the NFA, when a predetermined word is input, the only state required for transition in accordance with the concatenation rule corresponding to the word is generated; no state transitable by pursuing the succeeding null transitions is generated, as described above. The created NFA is held in the main memory 103 or the cache of the CPU 101 as shown in FIG. 1. The specific contents of an NFA creating process will be described later.

The analysis processing part 20 increments the value of variable s by 1 (step 707), and judges whether or not the end of input sentence (partitioned position of sentence) denoted by the punctuation or parenthesis is reached (step 708). If the end of sentence is not reached, the operation returns to the word candidate retrieving part 21 to repeat the processing following step 704 with the value of new variable S set at step 707.

On the other hand, if the end of sentence is reached, a plurality of transition paths may lead from the beginning of sentence to the end of sentence for the input sentence at this point of time. In other words, a plurality of possible combinations of word strings may compose the input sentence and its concatenation rules. Thus, the optimal solution searching part 23 searches for the optimal solution from among the plurality of transition paths generated (step 709). The search for the optimal solution is performed by known methods such as a minimum cost method of attaching the score (cost) to the transition path, adding the scores over the entire transition path, and adopting the minimum numerical value, or the minimum cost. The obtained optimal solution is output as the result of the morphological analysis (step 710). In the input sentence of "Nanpo ha natsu da." the following analysis result is obtained.

Nanpo / ha / natsu /da / ./
Noun/particle/noun/auxiliary verb/punctuation/

Thereafter, the analysis processing part 20 judges whether or not the value of variable s has reached the length S of input sentence (step 711). If s is less than or equal to S, the operation returns to the word candidate retrieving part 21 to repeat the processing following step 704. On the other hand, if the value of variable s exceeds S, the morphological analysis processing has been performed for the entire input sentence, and the processing is ended.

The NFA creating process at step 706 will be described below in detail.

Figure 8:
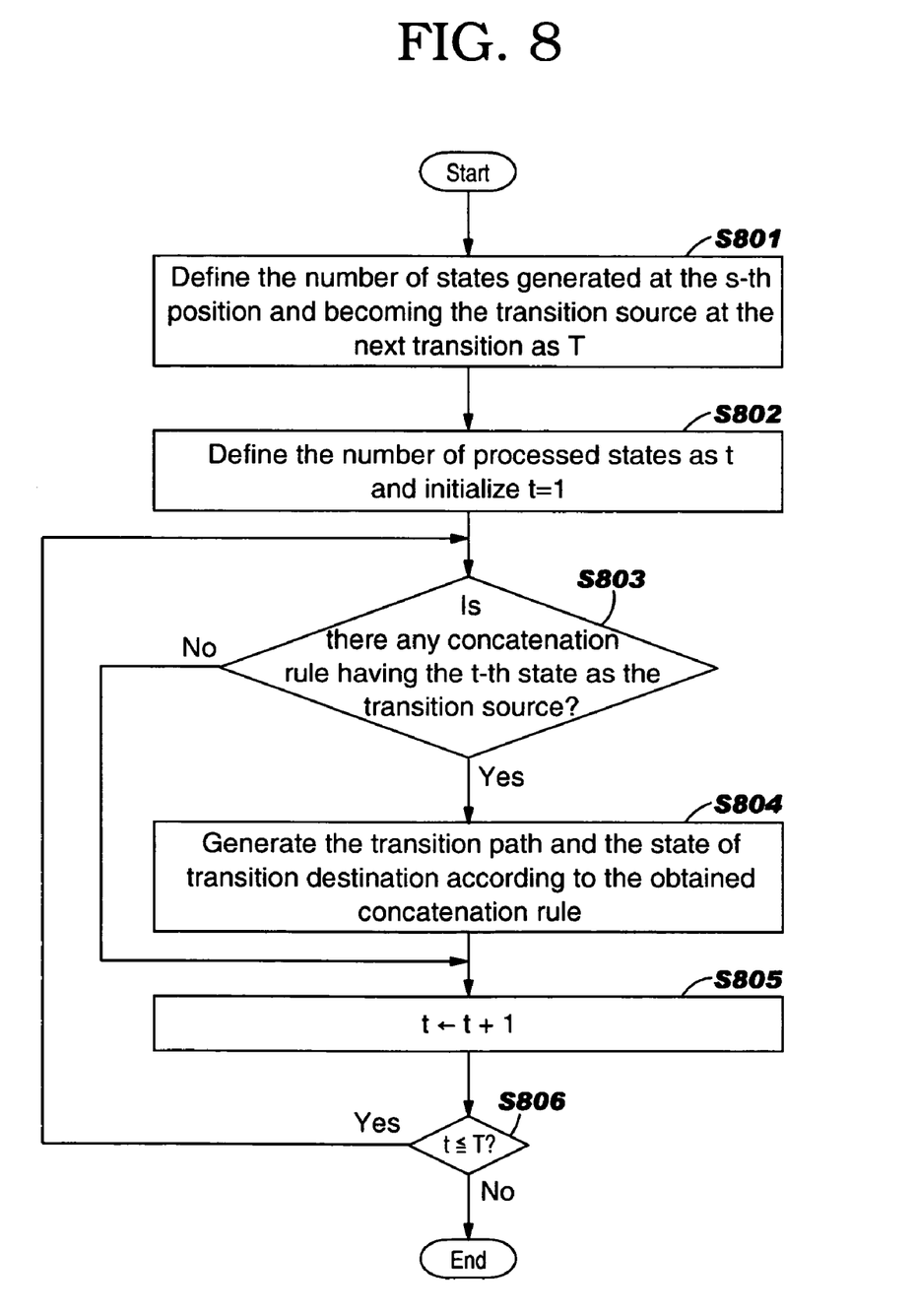
FIG. 8 is a flowchart for explaining the specific contents of processing at step 706 in FIG. 7.

FIG. 8 is a flowchart for explaining the specific contents of processing at step 706 in FIG. 7.

As shown in FIG. 8, the concatenation rule retrieving part 22 defines the number of states becoming the transition source at the next transition among the states generated at the s-th position of notice as T (step 801). The concatenation rule retrieving part 22 defines the variable indicating the number of processed states as t and initializes t (t:=1) (step 802).

The concatenation rule retrieving part 22 checks whether or not there are any concatenation rules retrieved at step 705 and having the t-th state as the transition source (step 803). If there is any concatenation such rule, the transition path and the state of transition destination are generated in accordance with the concatenation rule (step 804).

After the transition path and the state of transition destination are generated, or if there is no concatenation rule having the t-th state as the transition source, the value of variable t is incremented by 1 (step 805), and the processing following step 803 is repeated for all the states becoming the transition source (i.e., until t is equal to T) (step 806).

As described above, in this embodiment, when a predetermined word is input into the automaton, an immediately previously generated state is first examined to check whether or not the concatenation rule regarding the word can be accepted in the automaton, and the concatenation rule in which this state is the transition source is searched from among the concatenation rules retrieved by the concatenation rule retrieving part. This operation is applicable because it is known in advance which word has which concatenation rule by retrieving the word dictionary 30 and the grammar dictionary 40 to create the NFA corresponding to the input sentence, when the NFA is employed for the morphological analysis processing.

In the above way, the frequency of inputting the concatenation rule into the automaton to check whether or not the automaton can accept the concatenation rule is greatly decreased by searching for the acceptable concatenation rule with the state generated immediately before in the automaton as the key, employing the information as to which word has which concatenation rule, whereby the processing speed over the entire analysis processing can be increased.

When the concatenation rule is retrieved by the concatenation rule retrieving part, the binary search may be used to access each concatenation rule in searching the concatenation rule, if the detected concatenation rules are sorted with the state of transition source as the key, thereby enabling the search to be made efficiently. In this case, in the searching of the concatenation rule, when each state of transition source at the next transition is randomly accessed and each concatenation rule is linearly accessed, the number of times the concatenation rule is input into the automaton is equal to $\log(n)$ times, where n is the number of concatenation rules of objects to check whether or not the automaton can accept the concatenation rule.

With the conventional method of first searching the concatenation rule corresponding to the input word, then inputting the concatenation rule into the automaton, one by one, and judging whether the concatenation rule is acceptable, n is the number of times to input the concatenation rule into the automaton under the same conditions. Accordingly, when the value of n is greater, $\log(n) \ll n$. Thus, the number of trials is much smaller with this embodiment than with the conventional method. For example, when $n=256$, $\log(256)/256=8/200=0.04$, indicating that the number of trials is reduced by a factor of twenty-five.

Figure 9:
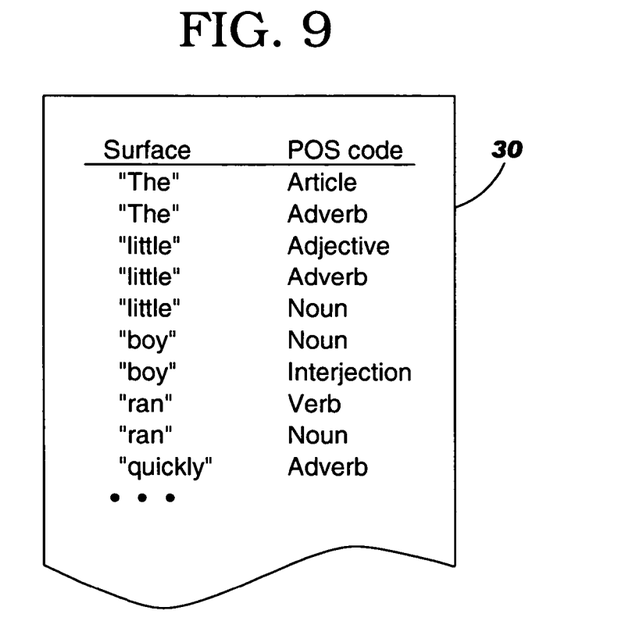
FIG. 9 is a diagram showing an example of a word dictionary when making the morphological analysis for English sentence in this embodiment.
Figure 10:
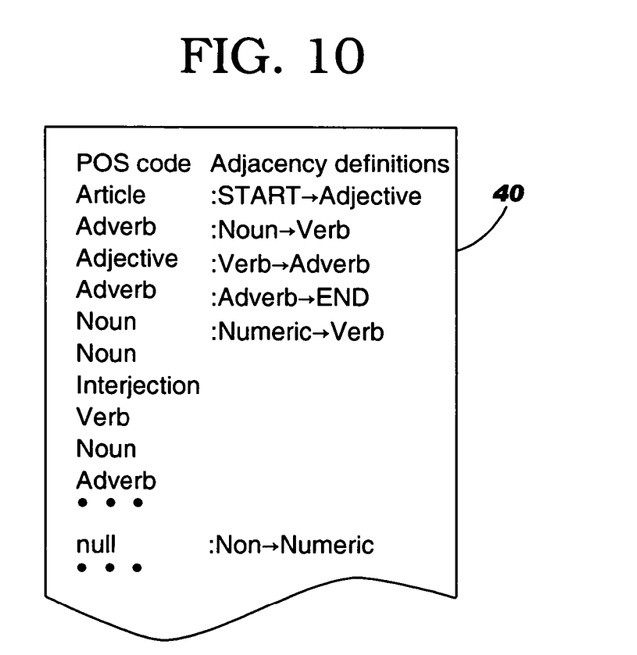
FIG. 10 is a diagram showing an example of a grammar dictionary when making the morphological analysis for English sentence in this embodiment.

Although Japanese is employed here for the purpose of illustrating the natural language sentence, the invention is also applicable to the morphological analysis of natural language sentences in other languages. For example, suppose that English word information is stored in the word dictionary 30, as shown in FIG. 9, and the concatenation rules are stored in the grammar dictionary 40, as shown in FIG. 10. In FIG. 9, words are registered in surface, and the part of speech for each word is registered in POS code. Also, in FIG. 10, the concatenation rule, namely, the state (node) of transition source and the state (node) of transition destination, is registered in Adjacency definitions.

In this case, the concatenation rule of null transition "null: Noun→Numeric" in FIG. 10 may be integrated with the concatenation rule of non-null transition "Numeric: Numeric→Verb" by a processing of the preprocessing part 10 as shown in FIG. 3, thereby creating the concatenation rule "Numeric: Noun→Verb."

Suppose that an English sentence "The little boy ran quickly." is given as the input sentence. In this case, the words are retrieved from the word dictionary 30 of FIG. 9 by the word candidate retrieving part 21, and the concatenation rule corresponding to each word is retrieved from the grammar dictionary 40 of FIG. 10 by the concatenation rule retrieving part 22, whereby the NFA is created by the optimal solution searching part 23.

For example, if "the (article)" is input, the transition path and the state of transition destination are generated based on the concatenation rule "article: START→adjective" for the Article, and subsequently, if "little (adjective)" is input, the transition path and the state of transition destination are generated based on the concatenation rule "adjective: adjective→noun" for Adjective.

At this time, since the concatenation rule of a null transition is integrated beforehand with the succeeding concatenation rule of a non-null transition, only the state required for transition is generated based on the concatenation rule, and none of the states transitable by pursuing the null transition are generated.

Also, for the concatenation rule applicable to the word "little," there are three cases: the word "little" may be Adjective, Adverb, and Noun, according to the word dictionary 30 of FIG. 9 and the grammar dictionary 40 of FIG. 10. To check which of the concatenation rules the automaton can accept, the concatenation rule may be searched with the state Adjective generated by the input of word "The (Article)" as the key, without inputting and trying all the concatenation rules into the automaton.

By the above operation, the automaton for the input sentence "The little boy ran quickly." is created, and finally the following analysis result is obtained:

The / little / boy / ran / quickly /. /
Article / Adjective / Noun / Verb / Adverb / /

As described above, though this embodiment is directly applicable to the morphological analysis of English sentences, the invention is also applicable as well to the morphological analysis for sentences in any other language.

I claim:

1. A computer-implemented method for performing morphological analysis of natural language sentences, comprising:
   retrieving words of a natural language sentence from a word dictionary stored within a word dictionary storage device;
   retrieving concatenation rules from a grammar dictionary, stored within a grammar dictionary storage device, for concatenation of said words, based on a part of speech of each retrieved word;
   creating a computer automaton corresponding to the natural language sentence based on the retrieved words and concatenation rules; and
   generating, responsive to entry of an input word into the computer automaton, states necessary for transition according to the concatenation rules corresponding to an input word without generating any state that is transited by pursuing a null transition succeeding the generated states.

2. The method according to claim 1, wherein
   the generating includes searching, when entering the input word into the computer automaton, a concatenation rule, a transition source of which is a just-previously generated state, from the retrieved concatenation rules regarding the input word.

3. A computer-implemented method for performing a morphological analysis of a natural language sentence, comprising:
   reading concatenation rules stored in a grammar dictionary, stored within a grammar dictionary storage device, and integrating first concatenation rules representing non-null transitions and second concatenation rules representing null transitions destinations of which are transition sources of the first concatenation rules to store the integrated concatenation rules in said grammar dictionary;
   retrieving words of a natural language sentence from a word dictionary stored within a word dictionary storage device;
   retrieving concatenation rules for concatenation of words from said grammar dictionary based on a part of speech of the retrieved words; and
   creating a computer automaton corresponding to the natural language sentence, based on said retrieved words and concatenation rules, wherein
   the creating further comprises generating, responsive to an input word entered into the computer automaton, states necessary for transition according to the concatenation rules corresponding to the input word without generating any state that is transited by pursuing a null transition succeeding the generated states.

4. A computer apparatus for performing morphological analysis of natural language sentences, comprising:
   a word candidate retrieving means for retrieving words of a natural language sentence from a word dictionary;
   a concatenation rule retrieving means for retrieving concatenation rules for concatenation of words from a grammar dictionary based on a part of speech of each word retrieved by said word candidate retrieving means; and
   a searching means for searching for an optimal solution of morphological analysis by creating an automaton corresponding to the natural language sentence based on the words retrieved by said word candidate retrieving means and the concatenation rules retrieved by said concatenation rule retrieving means;
   wherein said searching means generates, responsive to an input word entered into the automaton, states necessary for transition according to the concatenation rules corresponding to the input word without generating any state that is transited by pursuing a null transition succeeding the generated states.

5. The apparatus according to claim 4, wherein said concatenation rule retrieving means retrieves integrated concatenation rules from the grammar dictionary storing the integrated concatenation rules constituted by integrating a first concatenation rule representing a non-null transition and a second concatenation rule representing a null transition, wherein a transition destination is a transition source of the first concatenation rule.

6. The apparatus according to claim 5, wherein said concatenation rule retrieving means retrieves the integrated concatenation rules from the grammar dictionary storing the integrated concatenation rules constituted by integrating a plurality of concatenation rules representing transitions with states of null transition and capable of being consecutive.

7. The apparatus according to claim 4, wherein said searching means, responsive to entry of an input word in the automaton, searches a concatenation rule, a transition source of which is a just-previously generated state, from among the concatenation rules regarding the input word retrieved by said concatenation rule retrieving means.

8. A computer apparatus for performing morphological analysis of natural language sentences, comprising:
   a word dictionary that stores words of a natural language sentence;
   a grammar dictionary that stores concatenation rules of words stored in said word dictionary;
   an analyzing processor for performing morphological analysis using said word dictionary and said grammar dictionary; and
   a preprocessor configured to transform concatenation rules stored in said grammar dictionary to new concatenation rules by integrating first concatenation rules representing non-null transitions and second concatenation rules representing null transitions, destinations of which are transition sources of the first concatenation rules, prior to processing by said analyzing processor, wherein said analyzing processor is configured to create an automaton corresponding to the natural language sentence based on words retrieved from said word dictionary and concatenation rules retrieved from said grammar dictionary, and generate, responsive to an input word entered into the automaton, states necessary for transition according to the concatenation rules corresponding to the input word without generating any state that is transited by pursuing a null transition succeeding the generated states.

9. The apparatus according to claim 8, wherein said preprocessor is further configured to transform the concatenation rules to new concatenation rules by integrating a plurality of concatenation rules representing transitions with states of null transition and capable of being consecutive.

\* \* \* \* \*